S. T. HYDE.
Steam-Generator.

No. 203,157. Patented April 30, 1878.

Witnesses:
W. J. Cambridge
J. E. Cambridge

Inventor,
Seneca T. Hyde
per Fetchemacher & Stearns
Attys

UNITED STATES PATENT OFFICE.

SENECA T. HYDE, OF BOSTON, MASSACHUSETTS.

IMPROVEMENT IN STEAM-GENERATORS.

Specification forming part of Letters Patent No. 203,157, dated April 30, 1878; application filed September 8, 1877.

*To all whom it may concern:*

Be it known that I, SENECA T. HYDE, of Boston, in the county of Suffolk and State of Massachusetts, have invented certain Improvements in Steam-Generators, of which the following is a full, clear, and exact description, reference being had to the accompanying drawings, making part of this specification, in which—

Figure 1:
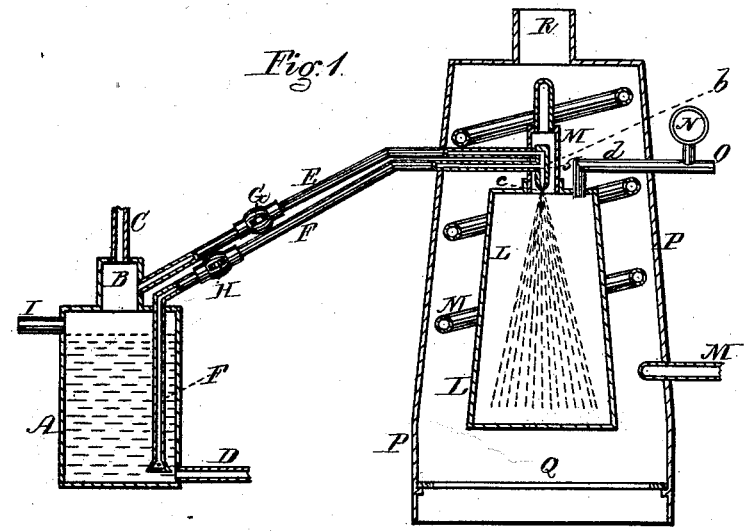
Figure 2:
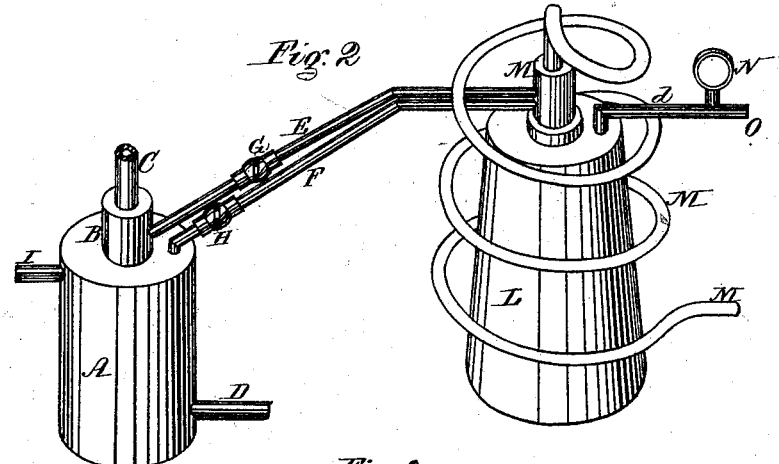

Figure 1 is a vertical section through a steam-generator constructed in accordance with my invention. Fig. 2 is a perspective view of the same, the furnace and outer casing being removed, and Fig. 3 sectional detail enlarged.

My invention has for its object to generate steam with great rapidity with a very small consumption of fuel, and at the same time diminish the liability of explosion.

My invention consists in a steam-generator provided with an atomizing apparatus consisting of an air chamber and pipe, and a water-pipe connected at the exit, by means of which the feed-water is introduced in the form of spray, which is instantly converted into steam, as the particles of water are widely diffused, and a large surface thereby presented to the direct action of the heat within the generator, the water, in its finely-divided state, requiring much less time, and the expenditure of much less fuel, to convert it into steam than would be the case in an ordinary generator, where the water in a compact body is acted upon by the heat.

My invention also consists in certain details of construction to be hereinafter referred to.

To enable others skilled in the art to understand and use my invention, I will proceed to describe the manner in which I have carried it out.

In the said drawings, A represents a closed tank, which is supplied with water through the pipe D by means of a suitable force-pump operated by the engine. At the top of the tank A, and connected therewith, is an air-chamber, B, which is supplied through the pipe C with compressed air, by means of an air-pump, also operated by the engine. The atomizing apparatus consists of a tube, E, of small diameter, which is connected with the air-chamber B, and a similar tube, F, which enters the top of the tank A, and extends down nearly to its bottom, as seen in Fig. 1, the opposite ends of these tubes (which are arranged side by side) entering a tube, M, which projects up from the top of the steam-generator L, which is thus connected with the air-chamber B and water-tank A.

The generator L, which may be of any suitable form and size, is supported within an outer casing, P, of brick-work or other suitable material, which is provided with a furnace, Q, located directly beneath the bottom of the generator, the smoke and products of combustion passing up through the casing P, and escaping through the stack or chimney R.

Figure 3:
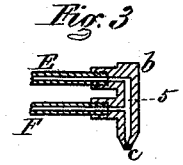

The ends of the tubes E F, within the tube M, are united by means of a short vertical portion, $b$, within which is a straight passage, 5, Fig. 3, communicating with both tubes E F, and terminating at its lower end in a discharge-orifice, $c$, of very small diameter, by which construction, as the water forced through the tube F enters the passage 5, it is acted upon by the blast of air from the tube E, which causes it to be discharged from the orifice $c$ in the form of fine spray, which is thrown into the interior of the generator L, where it is instantly converted into steam, the process being greatly accelerated by the finely-divided state of the injected water, which causes a large surface to be exposed to the direct action of heat, the water being evaporated as fast as it is introduced into the generator, and not accumulating on the bottom thereof. In practice only a portion of the spray reaches the bottom of the generator, and the latter is not, therefore, cooled, as would be the case if a solid stream of water was thrown onto it.

As the steam is generated it ascends into the tube M, by which it is conducted to the point where it is to be used. This tube is coiled spirally around the generator L, and being located within the casing P, is heated by the fire, and the steam passing through it (which is mixed with some of the lighter particles of spray not previously acted upon within the generator) is thus still further heated and expanded, the generating process being perfected in the tube M, and the steam thereby rendered dry and fit for use.

$d$ is a small horizontal tube connected with the generator, and to this tube is attached a safety-valve, O, and a steam-gage, N.

The tubes E F are provided with stop-cocks G H, and the water-tank A is furnished with a safety or escape valve, I, placed at the level at which it is desired to have the water stand.

The tank A being filled with water to the level of the valve I, or thereabout, and the fire being lighted in the furnace, the air force-pump, constructed to be operated by hand when required, is set in motion, and air forced into the chamber B, which acts on the water in the tank, and forces it through the tube F, the air itself also passing through the tube E, (the cocks G H being open,) and the feed-water is thus discharged in the form of fine spray through the orifice $c$ into the generator L, where it is converted into steam, as before described, the tank A being kept supplied with water by its force-pump, which is operated by the engine as soon as the latter is set in motion.

The safety-valve I of the tank A should be set or adjusted to resist a pressure about ten pounds higher than the safety-valve O of the generator L, so as to insure a constant flow of water and air from the tank A and air-chamber B to the generator L, and the force-pumps supplying the tank A and chamber B must each force, the one water and the other air, slightly in excess of the demand, causing a slight overflow or escape of air and water through the valve I, which insures the water being kept at the proper level within the tank and a given pressure uniformly maintained therein.

By means of the stop-cocks G H the supply of air and water can be cut off at any time, so that steam may only be made at such times as it is actually required; and when only a low pressure is called for, heated air alone may be used by simply closing the cock H and leaving the cock G open.

The end of the water-tube F in the tank A is enlarged, and provided with a strainer to exclude dirt, &c. If, however, either of the tubes E or F should require cleansing, a back flow can be created by shutting off the passage of steam through the tube M, and opening a vent connected with the chamber B, which would cause the steam in the generator L to flow back through the tube E or F, or both, as occasion might require.

If a power requiring more steam than can be produced with a single spray-jet should be needed, the jets can be multiplied according to the requirements of the case.

It will be seen that the spray enters the generator at the top, and is thrown downward, by which arrangement it is more perfectly diffused, and does not tend to cool the generator, as might be the case if it entered at the side thereof.

As the generator L contains no body of water, there is no water-level to maintain within it, and consequently no gage-cocks or water-gages are required, and the danger of explosion caused by negligence in allowing the water to descend below its proper level in an ordinary steam-generator is thus entirely avoided. Furthermore, if the pressure of steam within the generator should increase beyond the desired point, it is simply necessary to shut off the supply of water and air by closing the cocks H G in the pipes F E, when the generation of steam will instantly cease, causing the pressure to be immediately reduced as desired.

Steam can also be raised with great expedition, as there is no body of water to heat within the generator, and consequently the production of steam commences immediately after the fire is lighted, and the spray introduced within the generator, and a sufficient pressure to start the engine can thus be attained in much less time than heretofore, which is often of great importance.

In addition to the above advantages, my generator occupies very little space, is not complicated or expensive, and will produce a given quantity of steam with much less fuel than has heretofore been required, while the heating of the feed-water is dispensed with.

What I claim as my invention, and desire to secure by Letters Patent, is—

1. A steam-generator provided with an atomizing apparatus consisting of an air chamber and pipe, and a water-pipe connected at the exit, whereby the feed-water is introduced into the generator in the form of a fine spray, substantially as and for the purpose specified.

2. The generator L, with its furnace, in combination with the water-tank A, air-chamber B, air and water pipes E F, with their stop-cocks G H, and a device, 5, for converting the feed-water into spray as it enters the generator, substantially as described.

3. The combination of the heating-pipe or superheater M with the generator L, and the atomizing spray-producing apparatus, an air chamber and pipe, and a water-pipe connected to form a junction at its exit end, substantially as and for the purpose set forth.

Witness my hand this 5th day of September, A. D. 1877.

SENECA T. HYDE.

In presence of—
P. E. TESCHEMACHER,
W. J. CAMBRIDGE.